Aug. 18, 1959  J. S. PARSONS  2,899,823
AIR MILES AND AIR SPEED MEASURING SYSTEM
Filed Jan. 10, 1955  5 Sheets-Sheet 1

Inventor
J. S. Parsons
by R. J. Filipkowski
AGENT

Aug. 18, 1959 J. S. PARSONS 2,899,823
AIR MILES AND AIR SPEED MEASURING SYSTEM
Filed Jan. 10, 1955 5 Sheets-Sheet 3

Inventor
JAMES STUART PARSONS
by R. J. Filipkowski
AGENT

United States Patent Office 2,899,823
Patented Aug. 18, 1959

2,899,823

AIR MILES AND AIR SPEED MEASURING SYSTEM

James S. Parsons, Ottawa, Ontario, Canada, assignor to Computing Devices of Canada Limited, Ottawa, Ontario, Canada Application January 10, 1955, Serial No. 480,944

Claims priority, application Canada February 24, 1954

8 Claims. (Cl. 73—181)

This invention is concerned with the measurement of the rate of displacement of a body relatively to an enveloping fluid volume, or alternatively of a fluid with respect to a reference body, and is particularly directed to improvements in the measurement of true air speed and displacement substantially free of error over a wide range of densities of the fluid.

Attempts have been made heretofore to devise sensing apparatus for the measurement of the speed of an aircraft relatively to the air in such a way that errors due to non-uniformity of air density are made small or are approximately cancelled out. It has been appreciated for some time that Venturi tube or Pitot-static head devices, while serving well for constant density and temperature conditions of air speed measurement, are unsatisfactory in modern high speed aircraft. In addition to the effects caused by variations in the density and temperature of the air, the indications are seriously in error at speeds approaching sonic velocity and higher than sonic velocities. Consequently attention has turned to methods of measurement employing screw devices driven by the air stream or by an auxiliary motor means, for establishing a rotational velocity proportional to translational velocity.

In one prior art apparatus the air screw employs a symmetrical airfoil or blade as the sensing element, co-operating with a servo-controlled driving means for revolving the blade at a speed proportional to forward velocity. In this apparatus the zero angle-of-attack condition is determined by differential pressure sensing means carried by opposite faces of the blade to control the driving source speed, the latter being measured by a tachometer to indicate velocity. In another apparatus of the air screw type a blade used as a sensing element is mounted with limited freedom of rotation about an axis parallel to the chord of the airfoil section, while the blade and carrying structure rotate about an axis parallel with the air stream.

Air-screw devices employing blades of airfoil section associated with sensing elements to determine a null angle-of-attack condition of the section with the relative wind, have not been found adequate for making highly precise air speed determinations over a wide range of air speed, air density, and temperature conditions. Particularly in the range of air speeds approaching sonic velocity and above sonic velocity any indications derived may be greatly in error. At such velocities the detection of a zero angle-of-attack condition for an air screw by methods established for lower velocities is not possible.

The invention herein described seeks to avoid certain problems inherent in prior art devices by the use of a moving vane as the sensing element, whereby to improve on the accuracy of air-speed measurement over a wide range of speeds, air temperatures, pressures, and densities, such as are encountered by modern high speed craft. By the practice of the invention air-speed and air-miles measuring apparatus may be realized enabling translational velocity and displacement to be computed accurately, the measurements being substantially free of errors due to the effects of variations in density or temperature upon the sensing element. The apparatus moreover, may be used without adjustment or scale correction over a velocity range extending from very low speed to velocities in the trans-sonic range and higher.

The complete instrumentation required for obtaining the rate of displacement quantity for an aircraft comprises means for measuring one angle and one angular velocity or displacement, means for transmitting these quantities to a computing system, a computer for deriving a velocity or displacement by solving a vector relationship of these quantities and output means for indicating or representing the computed result. According to the invention these requirements are met by the use of precise and simple measuring devices co-operating with an electro-mechanical computing system whose outputs may be employed in a number of ways.

The invention comprises, in its most general form, a vane carried by a radial arm extending from a slender rotating boom, the vane describing a helix in space as the craft moves forward relatively to the air. The boom rotates at a known or controlled velocity about an axis parallel to the line of motion in accordance with a driving torque imparted thereto by the air stream, or by auxiliary motor means, or by a combination of these. The vane pitch angle is continuously measured by a sensing device in the boom, the angular velocity or displacement is also continuously measured, and these quantities are transmitted to a computing system. Outputs are derived in the form of an air miles log, an air speed indication, and can also be transmitted in the form of electrical impulses in a circuit in representation of incremental units of displacement. The latter form of output is desired for certain dead-reckoning computer equipment requiring an electrical input of air mile data, as is well known in the art.

According to the invention the computation of the rate of displacement is carried out as a trigonometric solution of a velocity vector triangle where information of the values of all angles and the vector magnitude of one side are known. The vector triangle describing the velocity components of the vane as a forward component parallel and equal to the motion of the carrying body, and a component at right angles thereto equal to the peripheral velocity, may be solved by virtue of the fact that the peripheral velocity of the vane and its pitch angle are measurable.

The practice of the invention in its preferred embodiments may be understood from a careful reading of the following description together with a study of the accompanying drawings, wherein—

Throughout the figures of drawing the same reference characters are used in referring to like parts.

Figure 1:
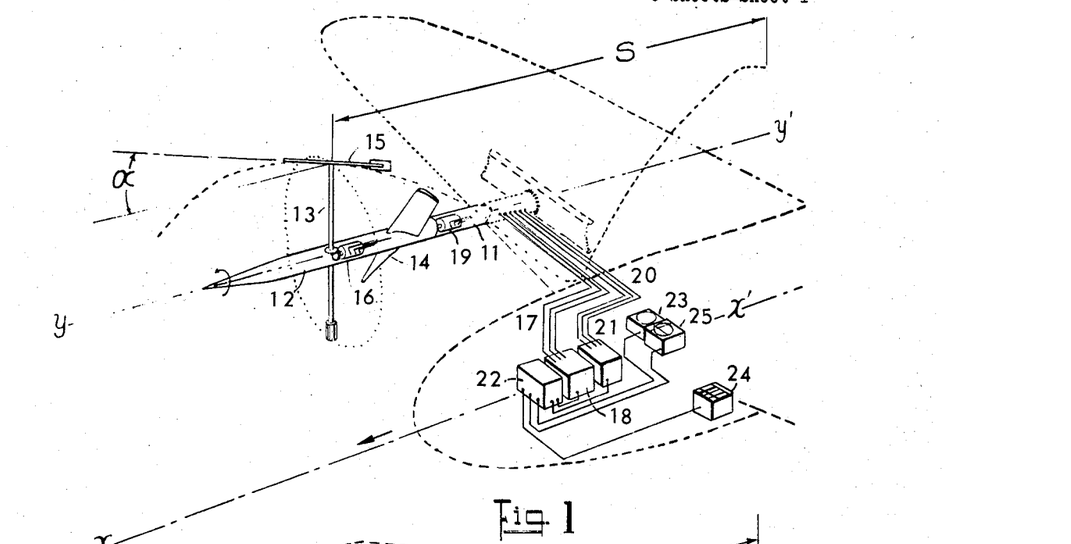
Figure 1 is a somewhat generalized perspective view of part of an aircraft equipped with apparatus according to the invention, using an air-driven propeller for driving the vane system.

Referring to Figure 1 of the drawing, an embodiment is seen to comprise a boom 11 fixed to an aircraft and extending forwardly of the wing. A spinner portion 12 carrying a radial arm or mast 13 and a driving propeller 14, is freely rotatable about the longitudinal axis $y$—$y'$ of the boom, this axis being parallel to the normal relative direction of translation $x$—$x'$ of the aircraft with respect to the air. The mast 13 is carried far enough forward of the body of the aircraft so as to operate in essentially undisturbed air. Propeller 14 may be integral with the spinner and is preferably located downstream of the mast. The pitch of its blades is fixed, and the choice of angle for a section at a given radius depends on design considerations of acceptable rates of rotation for the highest speeds the aircraft is capable of attaining. When the aircraft is moving along its line of direction $x$—$x'$ at appreciable speed, the reaction of the airstream with propeller 14 rotates the spinner assembly, here shown in a clockwise direction, whereby the vane 15 carried by mast 13 describes a helicoidal track in space as indicated by the dashed line. The vane and mast are freely rotatable about the axis of the mast, which is normal to the boom axis. The vane tends to align itself with the direction of flow of the relative wind. The value of the vane angle will be determined, as shown in Figure 2, by the ratio of peripheral speed to forward speed, the relationship being that indicated in the equation:

$$\alpha = \arctan \frac{R.\omega}{V} \quad (1)$$

where $\alpha$ is the vane angle with respect to aircraft heading,
R is the effective radius of the vane,
$\omega$ is the angular velocity of the spinner assembly, and
V is the forward velocity or rate of displacement of the aircraft with respect to the air stream.

Figure 2:
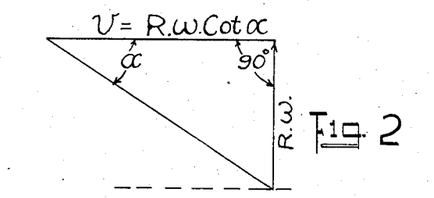
Figure 2 is an explanatory diagram showing the velocity triangle which analyzes the motions of the vane.

The velocity vector triangle is a right-angled triangle illustrated in Figure 2, wherein the vector quantities may be written more conveniently in the relation:

$$V = R.\omega \ cotangent \ \alpha \quad (2)$$

The foregoing relationships apply equally to any system for measuring relative flow where a vane, acting as a sensing element, has a known component of velocity imparted to it at right angles to the direction in which "V" is to be measured.

Under the conditions that no rotative forces are applied and the spinner assembly of Figure 1 is prevented from revolving, the vane will align itself with the relative wind, so that if the aircraft is moving forward the vane angle will be zero. Conversely, if the spinner assembly is driven by some source such as a motor and the aircraft or carrying body is held stationary with respect to the surrounding fluid, the vane angle will be 90 degrees, and the helix becomes a circle, as indicated by the dotted line. It is to be understood that the invention in its widest scope may be practiced by employing operating angles between these extremes. Generally in the case of aircraft instrumentation the equipment will be concerned with angles having values intermediate these limits.

Carried within the boom-supported spinner assembly at the location where the mast passes through the spinner is an angle-sensing and transmitting device such as, for example, a synchro generator 16. The device is arranged to be actuated by the mast, whereby information of the value of $\alpha$ is sent by conductors 17 to a receiver 18. The angular velocity of the spinner assembly is measured and transmitted by a device 19 such as a synchro generator or a tachogenerator carried within the fixed part of the boom, and signals therefrom are led further by conductors 20 to another receiver 21. The signals are suitably processed by apparatus associated with the receivers and are applied as inputs to a computor 22 which is arranged to perform the computation indicated by Equation 2. Separate outputs may be taken as shown for energizing various indicating devices such as an air speed indicator 23, calibrated in knots and/or Mach number values, an air miles log 24, and a dead-reckoning computer 25 for establishing air position or ground position. Suitable power supply (not shown) is provided to the units, for example 28 volt D.C. and 115 volt A.C. 400 cycle or 1000 cycle supply voltages from the aircraft's power systems.

While reference has been made to separate receiver blocks 18 and 21, such units may advantageously be combined with device 22 and may actually be inseparable therefrom, as will appear from the description of specific embodiments to follow.

Figure 1A:
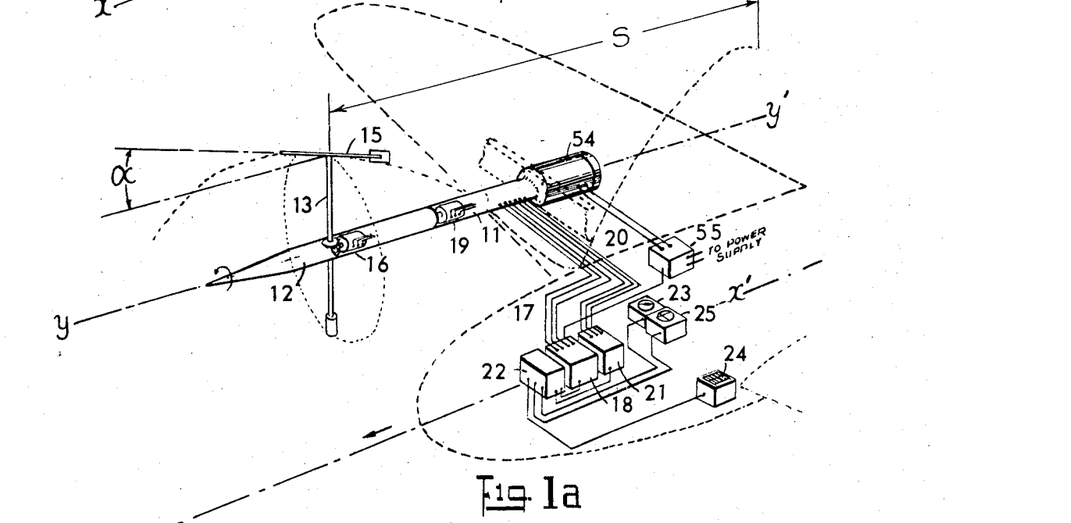
Figure 1a is an illustration of an embodiment employing a motor-driven vane system.

An alternative drive means is shown in Figure 1a, which substitutes a servo-controlled drive motor 54 for rotating the spinner assembly at speeds such that the vane angle is held within a desired range of values. The remainder of the system is similar in all respects with that described for the propeller-driven system, except for the power controlling device 55 which operates in dependence on the vane angle, derived from a receiver 18.

In the embodiment of Figure 1, it should be noted that since the propeller 14 is a fixed pitch device, the angular velocity about the boom axis will have a theoretical synchronous value proportional to any given forward velocity, although in practice the rotational speed would always tend to be less than the theoretical value. The ratio of actual rotational velocity to the synchronous rotational velocity as defined by the blade pitch setting at a given radial distance, will be less than unity depending on the density and viscosity characteristics of the fluid medium, and upon drag and friction characteristics of the boom, mast, vane, and bearing systems. The accuracy of the air speed measurement is not dependent upon achieving synchronous rotational velocity of an airfoil, nor is the rotational velocity of the spinner required to be strictly proportional to forward air speed. It is to be understood that whether the spinner assembly is driven by a propeller, by an electric or other motor means, or by a combination of drive means, the accuracy will not be dependent on variations in physical properties of the air. The determination of air speed may be made with an accuracy essentially proportional to the accuracy of measurement of spinner rotational velocity and of the vane angle. By the practice of the invention both quantities may be measured with great precision.

Figures 3, 4, 5, 6:
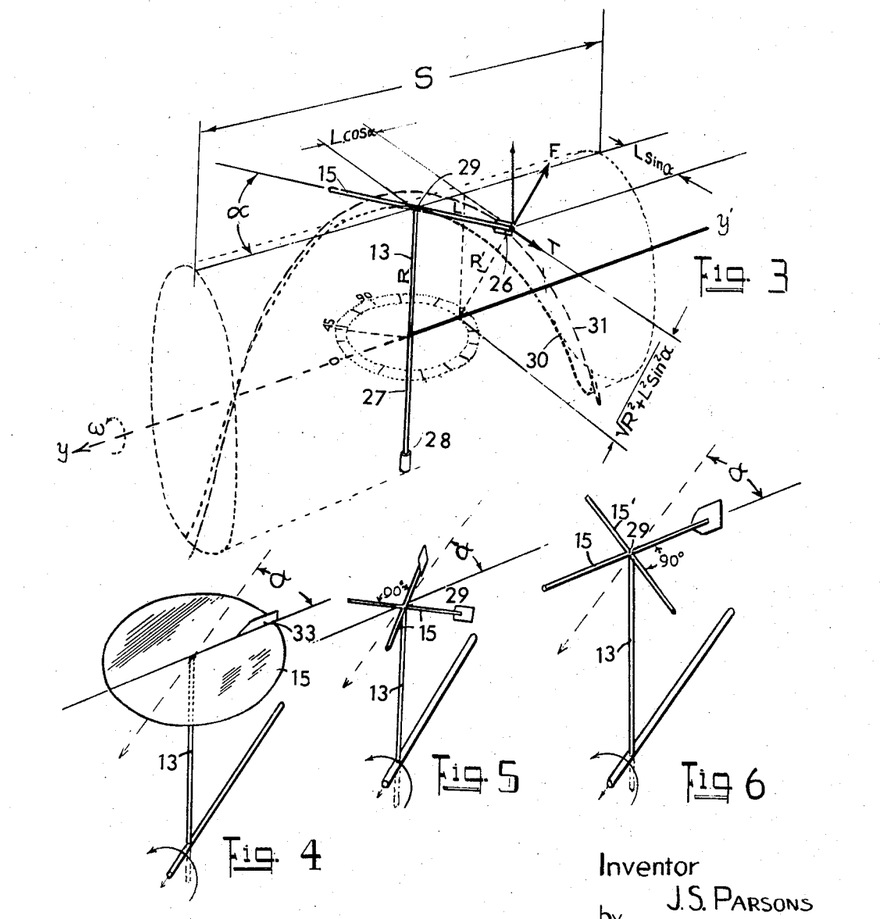
Figure 3 is a construction of the geometric relationships of the vane-carrying structures whereby the dynamic behaviour of the vane may be studied.
Figure 4 illustrates one form of vane structure.
Figures 5, 6, and 6a illustrate other preferred vane structures.

In Figure 3 the forces operative on the vane may be studied by an analysis of the geometry of the structure and degrees of freedom of the mast, vane, and spinner. A part of the helical path travelled by the end 29 of the mast is illustrated in relation to the axis $y$—$y'$. A second helical path, travelled by the center of pressure of the vane 26 at the trailing end of the slender shaft 15 of total length 2L, which assumes a vane angle $\alpha$ is illustrated superimposed on the first path. The mast 13 is of total length 2R, while a counter mass 28 on the extension 27 counterbalances the mast and vane dynamically, and, to a degree, aerodynamically. It will be seen that the path of the end of the mast, being the point about which the vane rotates is a helix 30 shown by a curved line of short dashes, the diameter of which is 2R units. The path of the center of pressure of the vane is another helix 31 shown as a line formed of longer dashes, and the diameter of this helix is larger than 2R depending on the angle α. When α is zero, that is when the vane shaft is parallel with the axis y—y', the two helices have the same diameter whereas if α is not zero, the vane helix 31 has the larger diameter.

For the present analysis the vane shaft is to be understood to be fixed to the mast at right angles thereto, and in its normal operating position to assume an angle α whose value will be in the range between 30 and 45 degrees with the line of direction y—y'. As will be seen in the drawing, the vane shaft, subject to a forward translation parallel to y—y' and to a rotation about axis y—y', tracks the relative wind so produced, to establish the angle α. The apparatus thereby relates the desired quantity, which is the forward velocity, to the peripheral velocity of the effective center of pressure of the vane and a trignometric function of the angle α. The apparatus is calibrated by determining the radial distance R' from the axis y—y' to the effective center of pressure of the vane, whereby the peripheral velocity is defined as a parameter directly proportional to spinner rotational velocity.

It will be apparent that, if the center of gravity of the vane and shaft structure is arranged to lie at the end of the mast 13 at point 29, the centrifugal force is directed outwardly along the mast axis. For a given mass M, the force has a value of:

$$F = M.R.\omega^2$$

where ω is the angular velocity in radians per second, about axis y—y'. The force serves to "stiffen" the mast against deflection due to drag in the relative air stream.

As the angle α is variable, and when the apparatus is in operation takes on a value of 30 or more degrees, the radial distance between the boom axis and any elemental length dL of the vane other than at point 29 is larger than R. It will also be seen that the direction along which centrifugal force urges such elemental length will not be parallel to the mast axis and the magnitude of the force will vary as a function of the distance, the latter being according to the relation:

$$\text{Radial distance} = (R^2 + \chi^2 \sin^2 \alpha)^{1/2}$$

where χ is the distance along the vane in either direction from the point 29. For the purpose of illustration the force vectors effective on an element at the end of shaft 15 are marked.

When, at a point χ units distance from the center of support 29, the force "F" due to the normal component of angular acceleration is not directed parallel to the mast axis, there is set up a turning moment or torque "T." The value of the torque for an elemental length dL and cross-section "S" units of area, and whose density is ρ, is:

$$T = \frac{S.\rho.dL(R^2 + \chi^2 \sin^2 \alpha)^{1/2} . \chi \sin \alpha . \omega^2 . \chi \cos \alpha}{(R^2 + \chi^2 \sin^2 \alpha)^{1/2}}$$

The vane having uniform mass distribution over all parts of its length 2L has an integrated total torque tending to rotate the vane and increase α toward the value of 90°. Its value is:

$$\text{Torque}_{total} = \tfrac{2}{3}(M.L^2 . \cos \alpha \sin \alpha) \omega^2$$

where M is one-half the total mass of the vane: ρ.S.L.

A simple vane supported at its mid-length may be shown by study of the foregoing analysis to tend to align itself at an angle larger than the true pitch angle.

It will also be apparent that offsetting such tendency is the reaction of the air or fluid with the vane as it assumes an angle with the relative wind. A simple vane may be employed where the error introduced by the small angle required to restore the vane is tolerable; if ω is kept small and the length L of the vane each side of point 29 is also small, while the area of the vane is made relatively large, such simple vane may be satisfactorily employed in an air speed measuring system according to the invention. However, for high speed craft where ω cannot be made small if suitable values of α are to be employed, and particularly where variations in air or fluid density are large, a corrected vane system must be used as will now be described.

If the disc vane 15 shown in Figure 4 is substituted for the arrow type of vane, and provided that the mass distribution is kept symmetrical along any diameter, it can be shown that there will be no torque tending to increase α, and the fin 33 will track the relative air or fluid stream. Such a vane is not suitable for high speed sensing apparatus not only because of the disturbing effects produced on the vane fin by the up-stream body of the disc, but because of the positive angle of attack inherent at the forward or leading part of the disc, and the negative angle of attack at the trailing edge, which, together with the finite area of the disc would develop objectionable lift and drag forces tending to bend the mast.

Organizations of the vane structure which are free of undesired torque effects due to the normal component of acceleration of the rotating parts are shown in Figures 5 and 6. In Figure 5, two arrow type vanes 15 having symmetry of mass distribution about their mounting points are fixed at right angles to each other and at right angles to the axis of rotation of the mast. The vanes and shafts may be shown to produce equal and opposite torques about the mast axis. For this structure larger values of drag are effective than for the system of Figure 6, wherein a single vane 15 and an equivalent shaft 15' at right angles thereto are each rigidly fixed at right angles to the mast and to each other.

The design and construction of a vane device according to the invention should observe the principle that the mass distribution on opposite sides of the point of support 29 should be symmetrical, that is, for a given mass located at a distance from this point, there should be an equal mass located at the same distance on the opposite side of and in line with the point of support. The masses should also lie at equal radial distances from the axis y—y'. It is to be understood that the mass distribution along any diameter need not be uniform; the cylindrical or rod-like construction illustrated for the vane shaft is practical and aerodynamically satisfactory, but other sections might be employed such as tubes, ellipses, square or rectangular sections of constant or tapering sectional area. The feather or vane fin may be made advantageously of a lightweight alloy sheet or strip set into a slit sawed lengthwise of the shaft and mounted in a plane including the mast axis. The mass of metal removed from the shaft should equal the mass of the strip inserted. In one embodiment which performed successfully, the vane is set on the shaft with the lower part of the fin mainly removed, suitable adjustment for mass distribution radially of the boom axis being made at the end of the shaft. Such construction, illustrated in Figure 6a, avoids disturbances in the relative fluid stream caused by the mast.

Figures 6A, 7, 8, 9:
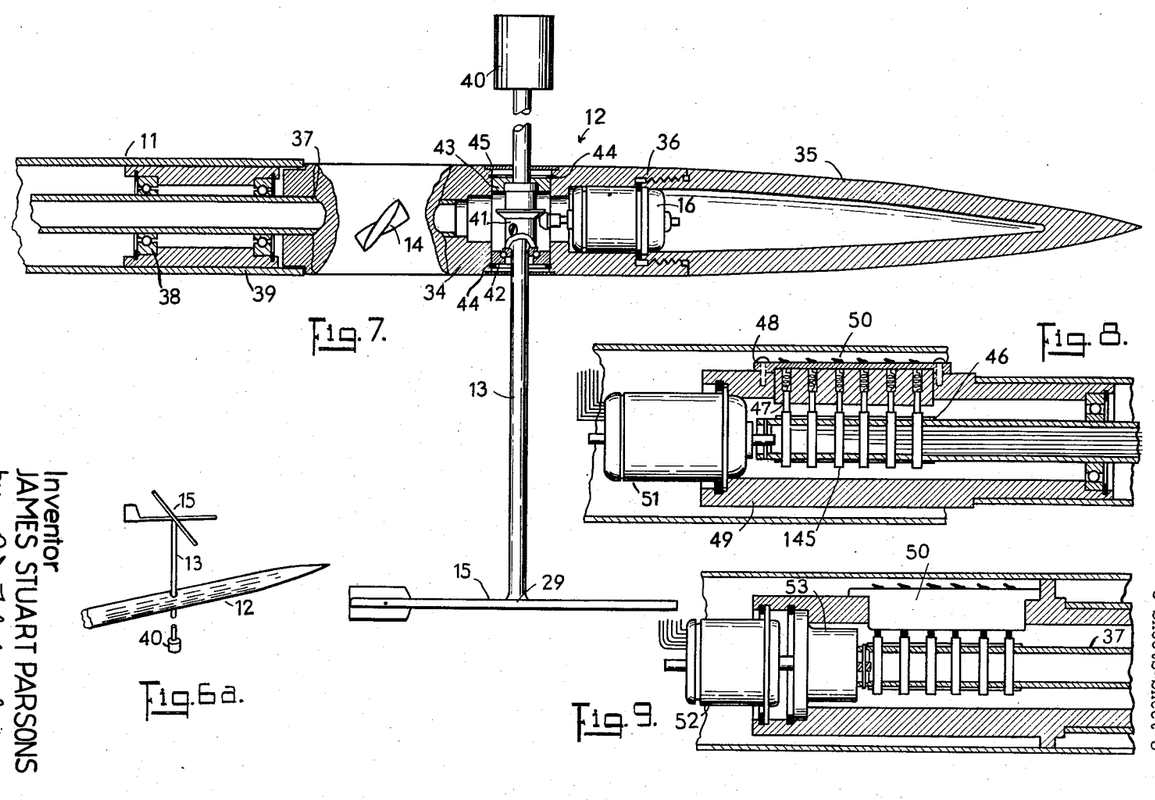
Figure 7 is a view partly in section of the construction of the rotating head and the mounting of the angle-sensing element.
Figure 8 shows an arrangement whereby the speed of rotation and other information may be taken from the boom.
Figure 9 illustrates a modification of Figure 8.

In Figure 7, the boom is shown in longitudinal section with the mast, vane, and counter arm in position. The rotating forward part or spinner 12 is shown as a thick-walled cylinder 34 into which the angle-sensing device 16 is set, and a hollow conoidal nose 35 threaded into the front part of the cylinder, and bearing against the retaining ring 36 by which device 16 is locked into position. A hollow axle 37 is inserted into and is firmly held by the cylinder 34 and extends back into the wing or fuselage of an airframe. Anti-friction bearings 38 permit free relative rotation between the axle 37 and the stationary portion 39 of the boom. Blades 14 of a driving propeller whereby the spinner assembly is rotated may either be attached to cylinder 34 or made integral therewith.

The mast 13 comprises a single slender rod or tube of steel or other suitable material passing through the boom, carrying the vane structure 15 at one end 29, and the counterweight and drag mass 40 at the other. Collar 41, pinned or otherwise affixed to the shaft is held between sets of bearings 42 seated in bushings or adaptors 43. The latter are restrained against movement normally of the boom axis by removable retaining rings 44. A collar or band 45 serves to protect further the internal parts and to fair this region of the boom aerodynamically.

In order to attain the highest precision of angular positioning of the vane in tracking the relative wind, the mechanical design of all rotating parts must avoid frictional loads as far as possible. Bearings 42 should be of the highest quality, preferably corrosion resistant, and suitable for operation over a wide range of temperatures, particularly with respect to lubricants that may be used.

The angular position of the vane 15 is transferred as a proportional rotation of the shaft of sensing device 16 by a pair of gears, here illustrated as bevel gears with a ratio greater than 1 where device 16 is a synchro transmitter although a ratio of unity may be employed depending upon available vane torque and precision required. If device 16 is a form of resolver the ratio of unity will be necessary. By the action of sensing device 16 an effect proportional to the vane angle may be derived as an electrical quantity and this transmitted by conductors (not shown) led within tube 37 to slip rings 145 as illustrated in Figures 8 and 9. In these figures, a set of rings 145 carried by the axle 37 and insulated therefrom and from each other by material 46 co-operate with brushes 47 carried by the insulating material 48 mounted on a stationary housing 49. From terminals 50 input or output electrical quantities may be taken or delivered to other parts of the system as will be described later.

In Figure 8 the apparatus for deriving an electrical quantity representing the rotational velocity of the axle 37 is illustrated as a directly-driven tachogenerator 51 mounted co-axially with the axle. The device provides an electrical quantity linearly dependent on velocity of shaft rotation; for example, this may be a direct voltage directly proportional to r.p.m., or an alternating voltage whose root mean square value is similarly proportional to the speed of shaft rotation. An example of a preferred device of the latter type is that specified as Mark 2, Model "0," Tachometer Generator standardized by the U.S. Bureau of Ordnance in a Catalogue of Precision Instrument Components, O.P. 1755. Such unit operates with an exciting A.C. voltage of 115 volts at a frequency of 400 cycles per second.

In the modification of Figure 9, a step-down gear box 53 is interposed between axle 37 and the shaft of device 52, which may be a synchro transmitter. By a suitable choice of gear ratio, one shaft revolution of synchro 52 may be made to represent a suitable unit of distance relatively to a fluid through which the spinner assembly has moved, for example one nautical mile or some fractional part thereof.

Figures 10, 11:
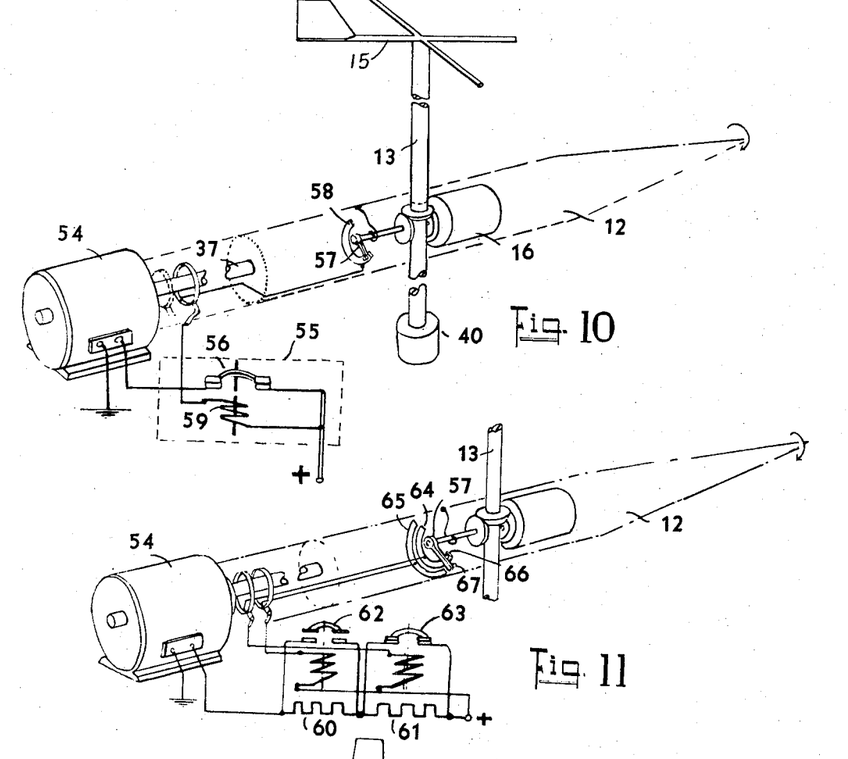
Figure 10 shows a view in perspective of the speed control and driving system for an electrically driven spinner assembly.
Figure 11 is an improved electrical drive system.

In Figure 1, a propeller with fixed pitch blades was shown as one example of driving power for rotating the spinner. This type of drive tends always to establish an equilibrium condition with the fluid stream, taking just enough power to overcome losses, and holding a rotational velocity close to the synchronous value for any given forward speed. It is to be understood that other means may be provided for obtaining the required rotational velocity, which may be for example, some form of electrical, hydraulic, or pneumatic motor, associated with suitable speed-controlling apparatus. In Figure 10, an alternative system according to the invention comprises in part a rotatable spinner 12 carrying a mast 13 and a vane assembly 15, to which rotational drive is imparted by an electric motor 54 mounted in driving relation with respect to shaft 37. A servo control 55 of the driving speed of the motor is arranged, which in the simplest form is shown as comprising a switch-operated relay 56 or contactor for applying electrical supply to or disconnecting it from the motor. At a location within the spinner adjacent to the point of entry of the mast, a control switch comprising a contact-making finger 57 wipes a conductive segment 58 under light pressure, taking a position relative thereto in accordance with the vane angle. The position of the segment 58 is so related that at the desired mean operating angle of the vane, the contact finger is just on the verge of breaking the circuit to the holding coil 59. The relay is preferably a type adapted for operation in aircraft under extremes of temperature, pressure and acceleration.

The action of the system is generally as appears in the following description. When the contactor 56 closes, the motor is energized, causing the spinner to turn at a rate depending on the drag load of the mast and vane, bearing friction and the characteristics of the motor. The latter should be so chosen that over the expected range of air speeds of the aircraft, the rotational velocity of the spinner should tend to increase to a value at which the vane angle exceeds 45 degrees. When the contact finger is driven off the end of the conductive segment, the contactor relay is de-energized, thereby breaking the motor circuit. The spinner then slows down until the vane angle has decreased to a value near the lower end of the preferred operating range, whereupon power is restored by the contactor 56. It will be seen that the data transmitted to the computor system consists of an irregularly varying value of vane angle detected by device 16 and a variable rotational velocity measured by suitable means (not shown). The variations lie within respective ranges determined jointly by the setting of the conductive segment 58 and by the frictional, torque, and inertial characteristics of the drive system.

In Figure 11 a somewhat different servo arrangement is provided, including a pair of resistances 60 and 61 in series with the supply, a pair of short-circuiting contactors 62 and 63 associated with respective resistances, a pair of conductive segments 64 and 65, and a contact-making finger 57 carrying two contacts 66 and 67 which wipe over respective segments. The angular spacing of the ends of the segments is arranged such that as the vane angle increases from a value below the mean operating angle, the contact-making finger leaves segment 65 first, and on further increase of the angle leaves segment 64. The action of the system is generally as described for Figure 10, except that the provision of serial resistances in the motor supply circuit and of contactor means for short-circuiting these resistances in response to predetermined vane angle values improves the regulation over wider ranges of speed and load than apparatus such as that of Figure 10. When the vane angle is slightly larger than the operating mean value, as occurs when the spinner over-speeds, the motor is energized through the two resistances in series, both contactors 62 and 63 being now open. Under these conditions, and with suitably chosen values of resistance, the motor will still supply some power, but only enough to drive the spinner at relatively low speed. Consequently the spinner rotational velocity will decrease gradually, until the contact 66 wipes segment 64 in response to a decrease in the value of the vane angle. The contactor 63 then shorts out the resistance 61, whereupon the motor develops greater torque and accelerates the spinner. If due to high forward velocity of the boom system the motor lacks sufficient power to hold the vane angle at the value corresponding to the first segment, the further decrease of angle brings contact 67 to the segment 65. The shorting out of the remaining resistance 60 results in the development of full power by the motor, which is selected to have a margin adequate for the highest speed and friction load expected.

If the two segments are spaced relatively closely in angular arc, for narrow limits of operating vane angles, and particularly if the angular moment of inertia of the rotating assembly is small, the variations in applied power to the motor and of vane angle may tend to be frequent. The interval between times when either contactor changes its state may be lengthened by adding a flywheel mass to the rotating assembly or by selecting a motor whose rotor satisfies the requirement of increased inertia. It is preferred that the contact-making finger of the servo system be mounted for actuation by a powered repeater synchro follow-up system remote from the spinner rather than directly by the mast, by arrangements such as will be described later. By avoiding any loading of the vane other than by the synchro generator 16 the highest precision of sensing of the vane angle may be ensured.

It will be understood and appreciated by those skilled in the art that more than two resistances and associated contactors may be employed to provide a further refinement of speed control and smoothness of operation, and that the foregoing examples are given by way of illustration only. Where a follow-up or repeater system is used, a motor-driven rheostat may be substituted for multiple contactors.

Figure 12:
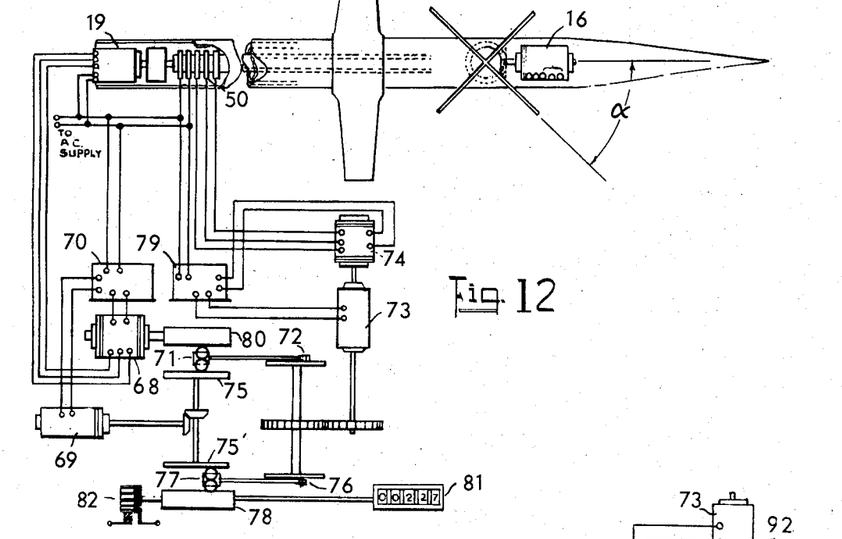
Figure 12 is a system operation diagram showing the manner of computing air-miles log information.

In Figures 12, 13, 14, and 15 the operations of complete systems wherein the invention is practiced are described, these systems differing in the choice of sensing devices and in the output information derived by computation. In Figure 12, the transmitter synchro 19 delivers information of the angular position of the spinner assembly continuously to the receiver synchro 68 whose rotor is positioned through ball-disc-roller friction drive devices powered by a motor 69. The error signal taken from receiver synchro 68 is applied to the input of an amplifier 70; as will be understood by those skilled in the art, the amplifier output is so arranged as to drive the motor 69 in such sense as to reduce the error in angular positioning of synchro 68 toward zero. The position of the balls 71 relative to the axis of rotation of the disc 75 is controlled by the sine function resolver device 72 operated by motor 73, which is directly coupled to receiver synchro 74. The value of the vane angle $\alpha$ is transmitted from the transmitter 16 by way of sliding brush terminals 50 associated with the slip rings as more clearly shown in Figure 8, to receiver synchro 74. The latter is caused to follow the vane position by servomotor 73, which is controlled by amplifier 79.

The rotor of receiver synchro 68 is driven by disc 75 by way of balls 71 and drum 80 at a rate which is proportional to the product of the r.p.m. of motor 69 with the sine function of vane angle $\alpha$. It is to be understood that the mechanical resolver element 72 positions balls 71 according to the sine function of its angular position imparted by direct drive from the repeater servo-motor 73. Accordingly the number of revolutions made by motor 69 for one revolution of the shaft of receiver synchro 68 is equal to:

$$\frac{1}{\sin \alpha}$$

The other element of the mechanical resolver, 76, is oriented to position balls 77 in accordance with the cosine function of $\alpha$. The output of drum 78 in r.p.m. is therefore the value of the r.p.m. of discs 75, 75', multiplied by the cosine of $\alpha$. This will be seen to represent the r.p.m. of the rotor of transmitter synchro 19 multiplied by:

$$\frac{\cos \alpha}{\sin \alpha}$$

which is the result required in accordance with Equation 1.

It will be apparent that over a period of time, the revolutions of drum 78 may be counted, as by a suitably-calibrated counter 81 to provide a register of air-miles flown, or total displacement of the system relatively to a fluid. It will also be obvious to those versed in the art to convert the rotation of drum 78 into electrical impulses representing particular increments of displacement, for example, units of one nautical mile, by a type of commutator or interrupter 82, for the purpose of operating remote air-miles log units or dead-reckoning computors and the like.

While for most purposes the important indication to a navigator of high-speed craft is the air-miles log and display of air position or ground position, in certain applications it is desirable to provide an indication of air speed. One such system will now be described, with reference to Figure 13. A portion of the fixed boom 11 housing a tachogenerator 51, and the rotatable spinner assembly 12 driven by the reaction of the air stream with propeller blades 14 are shown. Vane system 15 is freely rotatable about a mast axis as shown in previous diagrams, and is arranged to position the rotor of a synchro resolver unit 83 in accordance with the value of vane angle $\alpha$. Slip rings 45 are provided for applying exciting voltage and obtaining resolved values to be transmitted to other parts of the system. Suitable electrical supply to the system is applied to terminals 93.

Figure 13:
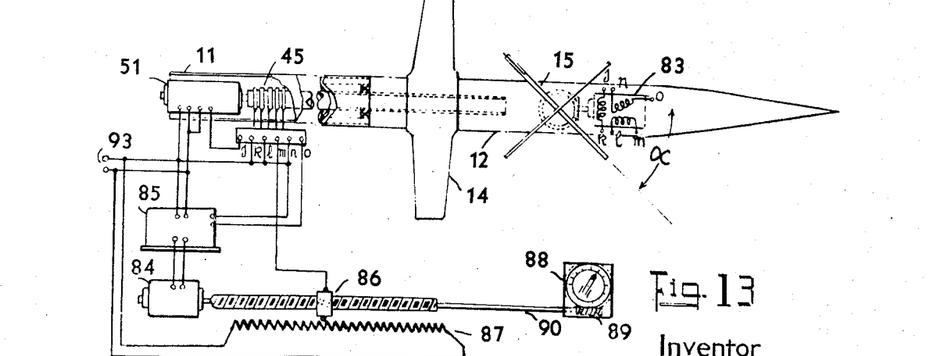
Figure 13 relates to a computing system for deriving air-speed indications.

The action of the computer system may be described as follows. The output voltage of tachogenerator 51 at the frequency of the exciting supply is applied to one winding $(j, k)$ of the stator of resolver 83. As will be readily understood by those skilled in the art, a resolver of this type is normally operated by applying an A.C. voltage to the terminals of the rotor; by a transformer action, voltages are induced in the two stator windings whose amplitudes are related to the exciting voltage amplitude as the sine and cosine functions of the rotor angular position with respect to a reference angular position. In the present application, the resolver is used in a servo system as a source of error signal for controlling the motor 84 which is part of a lead-screw operated voltage-adjusting system for exciting the second stator winding $(l, m)$ of the resolver. More particularly, the net induced voltage sensed by rotor winding $(n, o)$ at a particular vane angle by reason of some discrepancy in the sine-cosine relation of voltages applied to windings $(j, k)$, $(l, m)$ acts upon amplifier 85 to cause motor 84 to position tap 86 of rheostat 87 in such way as to diminish the rotor voltage. In the apparatus described, the rheostat 87 should have a linear resistance characteristic and a range permitting winding $(l, m)$ to be excited by voltages ranging from zero to a maximum related to a maximum tachogenerator output. It is evident that the displacement of tap 86 directly represents the forward velocity of the vane system, and a suitable indicator 88 may take the form of a pointer driven by a worm 89 fastened to the shaft 90. For a given rotational velocity of spinner assembly 12, the output of the tachogenerator is:

$$K \cdot \omega$$

where K is a proportionality constant. The effect of this exciting voltage on the rotor winding $(n, o)$ is to induce a voltage therein of magnitude:

$$\frac{K \cdot \omega}{\sin \alpha}$$

For a voltage "E" applied to winding $(l, m)$ the effect on the rotor winding is:

$$\frac{E}{\cos \alpha}$$

When the value of "E" is correctly adjusted and of such sign as to result in zero net induced rotor voltage, $$E = K.\omega.\cos\alpha/\sin\alpha$$

Therefore the position of the tap 86 serves to indicate the forward velocity as previously represented by Equation 1.

Numerous other arrangements for representing the velocity of air speed will present themselves to those skilled in the art, and the invention is not to be construed as precisely limited to the arrangement shown in Figure 13. For example, a variable transformer may be employed as an equivalent of the resistance device 87.

Figures 14, 15:
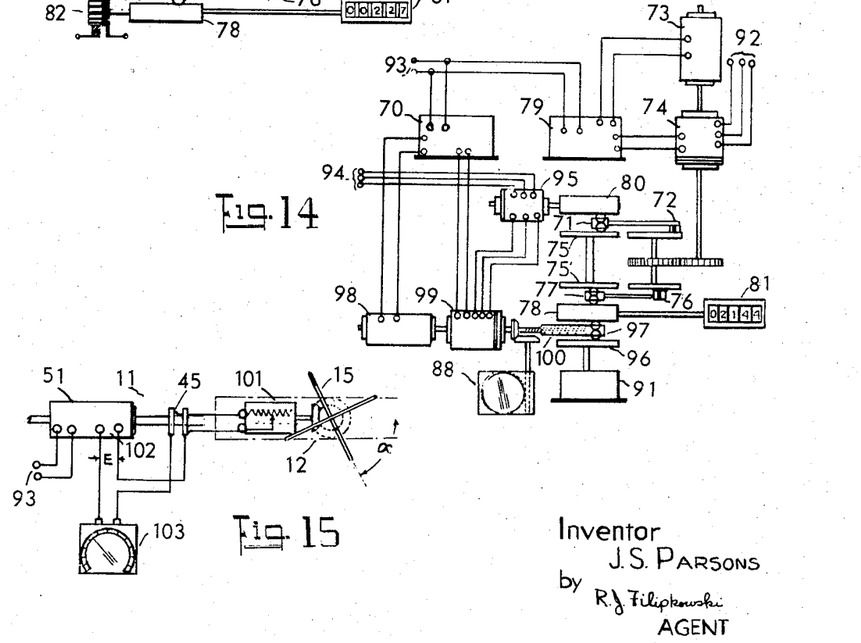
Figure 14 concerns a system including computing elements for deriving both air-miles log information and air speed.
Figure 15 is one form of direct analogue computing apparatus for use with the invention for deriving indications of air speed.

Turning now to Figure 14, an embodiment is described for obtaining both air-speed as well as air-miles total displacement. The apparatus is for the most part essentially as discussed in Figure 12 of the drawing, with the addition of a constant-speed drive motor 91, and with further differences which will be enlarged on in the following description.

The apparatus for positioning the mechanical resolvers 72 and 76 is identical with the counterparts of Figure 12 and includes a motor 73 coupled to the shaft of receiver synchro 74, which delivers error signal to the controlling amplifier 79. The electrical quantities representing the value of the vane angle $\alpha$ are derived from a vane-controlled transmitter synchro (not shown) and are applied to terminals 92. A suitable source of electrical supply is understood to be provided at terminals 93. The electrical information of rotation of the spinner assembly is supplied by a transmitter synchro directly coupled to the driven members (not shown) similarly to the arrangement in Figure 8, and is applied to terminals 94. Device 95 is a differential transformer unit which receives the information of angular displacement at one set of terminals, and produces at the other set an output indicative of the difference between the rotor position and the input data. The drum 80, directly coupled to the rotor of differential 95, is itself driven from disc 75, through balls 71 which are positioned according to a sine function of vane angle $\alpha$. It will be seen that for zero differential output, disc 75 must rotate at a rate:

(r.p.m. of spinner assembly) (1/sin $\alpha$)

Drive for the discs 75, 75' is supplied by a constant speed motor 91 which may be a suitable clockwork or electrical device or a clockwork-governed electrical unit, by way of disc 96, ball set 97, and ball set 77. The latter is positioned relatively to the axis of disc 75' in accordance with the cosine function of $\alpha$, by resolver element 76. It will be apparent that, for the condition that device 95 should deliver zero difference output, drum 78 must rotate at a rate which is:

$$\frac{\text{r.p.m. of spinner assembly}}{\sin\alpha/\cos\alpha}$$

and therefore represents the forward velocity "V" defined by Equation 1. Counter 81 operates to integrate or accumulate a total representing the log of air miles or displacement.

In order to impart to drum 78 the correct rate of rotation, ball set 97 is positioned relatively to the axis of disc 96 through a lead-screw system 100 by motor 98 which is ganged with receiver synchro 99. The radial position of ball set 97 represents forward velocity, as may more conveniently be displayed by the worm-driven pointer of indicator 88.

Under equilibrium conditions, for a steady value of air speed, the drum 80 will be rotating synchronously with the spinner assembly, an unvarying difference signal will be transmitted to receiver synchro 99, and zero error signal will be applied to amplifier 70, whereby motor 98 remains at rest. For any disturbance of the steady condition to a new value of forward air speed, motor 98 will operate to re-position ball set 97 to a new equilibrium position.

A further embodiment suitable for applications where only the true air speed is desired is shown in Figure 15, this apparatus directly performing the analogue operation:

$$V = R.\omega. \text{cotangent } \alpha$$

by an electrical circuit. A tachogenerator 51 excited by a stabilized supply applied to terminals 93 delivers an output voltage at terminals 102 directly proportional to spinner rotational velocity. Spinner assembly 12 is understood to be driven by suitable drive means which may be of the propeller or motor type, at such velocity that the value of vane angle $\alpha$ is of the order of 45 degrees. It will be apparent that angles smaller than 45 degrees may also be employed, and may be preferable for fluid flow measurement at very high velocities.

The vane system 15 is arranged to operate a variable resistance element 101 so that the resistance value for any operating value of vane angle, as measured between the terminals is proportional to the product of some constant and the tangent of $\alpha$. In the circuit shown, indicator 103 is a current-measuring device such as a milliammeter presenting low impedance when in series with other parts of the circuit. If the impedance of the generator and conductors is kept small, the current "I" measured by the device is proportional to the quotient $E/R$, where R has the value indicated above. Hence "I" may be expressed as:

$$I = E.k.\text{cotangent } \alpha$$

and therefore is a measure of the forward speed of the assembly.

As many variations of the arrangement of Figure 15 will readily be apparent to those versed in the art, it is to be understood that an air-speed measuring system according to the invention is not limited to the series circuit analogue computor described. Direct analogue computation may be carried out in other ways, for example by measurement of a voltage using a variable transformer element rather than the variable resistance device. By such apparatus an alternating voltage output from a tachogenerator may be passed through the transformer which satisfies the requirement that the output be related to the input as the cotangent of vane angle over a range of operating angles, and the output voltage may be read directly by a voltmeter as air speed.

While in the foregoing description reference has been made to particular embodiments useful for the measurement of the air speed or air-miles log of an aircraft, the fullest scope of the invention includes all measurements of fluid flow whether of rate or distance or quantity of flow. Moreover, it is immaterial whether the flow of fluid is a gas, vapour, or liquid flow, the teachings of the invention being applicable to systems operating with any one or more of these media.

The term "vane" is used through out the specification and claims in referring to the sensing element. It is to be understood that a vane includes a dynamically stabilized structure, that is, a construction whereby the tendency of a single shaft element to assume a 90 degree position under the effects of normal component of acceleration is cancelled by an equal and opposite force, as described.

I claim:

1. A device for measuring velocity of fluid flow comprising a cross-shaped sensing vane including a finned shaft and a transverse dynamic stabilizing shaft fixed to each other at their mid-length positions and at right angles to a mast, a spinner rotatable about an axis, means supporting the mast and vane freely rotatable in the spinner about a mast axis at right angles to the spinner axis, a motor, means to drive said spinner by the motor, a motor control circuit, means actuated by the mast and operative in the motor control circuit to regulate the rotational speed of the spinner, a vane-angle sensing device operated by the mast, means for measuring the rotational speed of the spinner, means to compute the product of the said rotational speed and the cotangent of the vane angle, and means to indicate the product as velocity of flow in a direction parallel to the spinner axis.

2. The device of claim 1 wherein the means actuated by the mast comprise at least one wiping contact associated with a corresponding conductive segment forming part of a relay energizing circuit, said relay being energized to decrease the value of series resistance in the motor circuit in response to the completion of circuit between the contact and segment.

3. An air speed measuring system comprising a vane carried by an aircraft to be in the free air stream, a rotatable shaft having its axis aligned with the flight direction, a rotatable mast supported by the shaft at right angles thereto and supporting the vane fixed to an end thereof, drive means effective to produce a predetermined rotational velocity of the shaft and a corresponding tangential velocity of the vane, whereby the vane is translated along a helicoidal path and subjected to a resultant relative air stream tending to cause its alignment therealong, a first signal transmitter comprising a synchro resolver actuated by the vane for transmitting a signal representing the value of the helix angle with respect to the flight direction, a second signal transmitter comprising a tachogenerator actuated by the drive means for deriving a signal representing the tangential velocity of the vane, means applying the output of the tachogenerator to a stator winding of said resolver, a servo-controlled voltage regulator comprising an amplifier to which the voltage induced in the rotor winding of said resolver is applied, a motor drive means to which is applied as input the output of said amplifier, means for actuating said voltage regulator by said motor drive means to effect adjustment of a further voltage, means applying said voltage to a second stator winding of said resolver, said motor drive means operating in such sense as to reduce the input to said amplifier toward zero, and indicator means operated by said motor drive means to provide an indication of air speed.

4. The system of claim 3 wherein the drive means is a propeller driven by the air stream.

5. In apparatus for measuring air-miles flown along a direction by an aircraft, drive means effective to translate a sensing element along a circular path in a plane fixed with respect to the said aircraft and at right angles to the said direction, a first angular-position sensing transmitter synchro actuated by said drive means, a first receiver synchro electrically connected thereto and arranged to be driven thereby to assume an angular position corresponding with that sensed by the said transmitter synchro and to generate an error signal output proportional to difference between the angular position sensed and the angular position assumed, a second angle-sensing transmitter synchro associated with the sensing element for measuring the angle made with the direction by the flow streamlines of the relative airstream at the element, a second receiver synchro electrically connected thereto and arranged to be driven thereby to assume an angular position corresponding with that sensed by the said second transmitter synchro and to generate an error signal output proportional to the difference between the angular position sensed and the angular position assumed, a first motor, a first and a second friction disc driven by said motor, a second motor effective to drive the second receiver synchro and a sine-cosine mechanical resolver ganged therewith to establish an angular position, a first friction cylinder and a first set of balls associated with said first friction disc, a second friction cylinder and a second set of balls associated with said second friction disc, means positioning said first set of balls radially of said first disc in accordance with the setting of the sine element of said resolver, means positioning said second set of balls radially of said second disc in accordance with the setting of the cosine element of said resolver, means coupling the shaft of said first receiver synchro with said first friction cylinder, a first amplifier, means applying as input to said amplifier the error signal output of said first receiver synchro, means applying as input to said first motor the output of said first amplifier, whereby to rotate said friction discs in such sense as to reduce the error signal from said first receiver synchro toward zero, a second amplifier, means applying as input to said second amplifier the error signal output of said second receiver synchro, means applying as input to said second motor the output of said second amplifier, whereby to effect a follow-up of said second receiver synchro with the second transmitter synchro, and means to register the rotation imparted to said second friction cylinder in representation of the product of the angular displacement measured by said first transmitter synchro with the cotangent of the angle at the sensing element measured by said second transmitter synchro.

6. In apparatus for measuring air-miles flown along a direction by an aircraft and for indicating air speed, drive means effective to translate a sensing vane device along a circular path in a reference plane fixed with respect to said aircraft and at right angles to said direction, a first transmitter synchro actuated by said drive means, a differential transformer unit having an output and having an input electrically connected to said first synchro, a second angle-sensing transmitter synchro associated with the vane device for measuring the angle made with the direction by the flow streamlines of the relative airstream at the vane device, a first receiver synchro electrically connected to said second synchro and arranged to be driven thereby to tend to assume an angular position corresponding with that sensed by the said transmitter synchro and to generate an output proportional to the magnitude and the sense of the difference between the said sensed and the said assumed angular positions, a first drive motor having constant speed characteristics, a first friction disc driven by the first motor, a first set of balls, a first friction drum driven from said first disc by said first set of balls, a second and a third friction disc ganged together and driven by a second set of balls from said first friction drum, a second friction drum driven by a third set of balls from said third friction disc, a direct drive coupling between said differential transformer unit and said second friction drum, a sine-cosine mechanical resolver ganged with said first receiver synchro, means positioning said third set of balls radially of said third disc in accordance with the setting of the sine element of the resolver, means positioning said second set of balls in accordance with the setting of the cosine element of the resolver, a second motor arranged in driving relation with the mechanical resolver, a first servo-amplifier having its input connected to the output of said first receiver synchro and having its output connected to said second motor whereby to effect a follow-up of the resolver setting in accordance with the aforesaid angle, a second receiver synchro having an input and an output, a third motor arranged in driving relation with the second receiver synchro, a second servo-amplifier, means actuated by the third motor for regulating the position of said first set of balls radially of the first disc, means connecting the output of said differential transformer unit to the input of said second receiver synchro, means applying as input to said second amplifier the output of said second receiver synchro, means applying the output of said second receiver synchro, means applying the output of said second servo-amplifier as supply to the third motor, a cumulative register driven by the first friction drum to log air-miles flown, and an air-speed indicator operated by the means regulating the position of the first set of balls to indicate air speed.

7. A device for measuring the velocity of fluid flow relative to a body comprising a cross-shaped sensing vane including a finned shaft and a transverse dynamic stabilizing shaft fixed to each other at their mid-length positions and at right angles to a mast, a spinner rotatable about an axis, means supporting the mast and vane freely rotatable in the spinner about a mast axis at right angles to the spinner axis, propeller means fixed to said spinner adapted to be driven by relative flow of fluid to cause said spinner to rotate, a vane-angle sensing device operated by the mast, means for measuring the rotational speed of the spinner, means to compute the product of said rotational speed times the cotangent of the vane angle, and means to indicate the product as a velocity of flow in a direction parallel to the spinner axis along the body.

8. An air speed measuring system for a body comprising a cross-shaped sensing vane including a finned shaft and a transverse dynamic stabilizing shaft fixed to each other at their mid-length positions and at right angles to one end of a mast to lie in the free relative air stream about the body, a rotatable spinner journalled in the body and having its axis of rotation substantially aligned with a reference direction, means supporting said mast and vane freely rotatable in the spinner about a mast axis at right angles to the spinner axis, a mast extension aligned with said mast and supporting a counterweight formed as a body of revolution about said mast axis, propeller driving means carried by the spinner for producing rotation of said spinner and a translation of said vane about said spinner axis, means for measuring the rotational speed of the spinner, a vane-angle sensing device operated by the mast, means to compute the product of said rotational speed and the cotangent of the vane angle, and means to indicate the product as air speed in the reference direction.

References Cited in the file of this patent
UNITED STATES PATENTS

| | | |
|---|---|---|
| 1,655,125 | Baule | Jan. 3, 1928 |
| 2,512,278 | Jones | June 20, 1950 |
| 2,524,747 | Ayres | Oct. 10, 1950 |
| 2,531,521 | Link | Nov. 28, 1950 |
| 2,609,686 | Peterson | Sept. 9, 1952 |
| 2,618,973 | Peterson | Nov. 25, 1952 |
| 2,632,327 | Smith | Mar. 24, 1953 |